(12) United States Patent
Youngstrom et al.

(10) Patent No.: US 11,119,334 B2
(45) Date of Patent: Sep. 14, 2021

(54) CURVED DISPLAY OF CONTENT IN MIXED REALITY

(71) Applicant: Microsoft Technology Licensing, LLC, Redmond, WA (US)

(72) Inventors: Eric Youngstrom, Kirkland, WA (US); John P. Falcone, Kirkland, WA (US); Craig Hoffman, Sammamish, WA (US); Hein Thu Htat, Austin, TX (US); Scott Borton, Seattle, WA (US); Ram Bracha, Seattle, WA (US); Felix GTI Andrew, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 16/789,118

(22) Filed: Feb. 12, 2020

(65) Prior Publication Data
US 2020/0183181 A1    Jun. 11, 2020

Related U.S. Application Data (63) Continuation of application No. 15/899,241, filed on Feb. 19, 2018, now Pat. No. 10,585,294.

(51) Int. Cl.
| | |
|---|---|
| *G06T 19/20* | (2011.01) |
| *G02B 30/35* | (2020.01) |
| *G06T 17/20* | (2006.01) |
| *G06T 17/30* | (2006.01) |
| *G06F 3/0481* | (2013.01) |
| *G06F 3/01* | (2006.01) |

(52) U.S. Cl.
CPC .............. *G02B 30/35* (2020.01); *G06F 3/011* (2013.01); *G06F 3/04815* (2013.01); *G06T 17/20* (2013.01); *G06T 17/30* (2013.01); *G06T 19/20* (2013.01)

(58) Field of Classification Search
CPC ......... G06T 17/20; G06T 17/30; G06T 19/20; G02B 30/35
USPC ....................................................... 345/419
See application file for complete search history.

(56) References Cited

U.S. PATENT DOCUMENTS

2016/0313800 A1* 10/2016 Noda ................... G06F 3/0346

\* cited by examiner

*Primary Examiner* — Thomas J Lett
(74) *Attorney, Agent, or Firm* — Davin Chin; Chin IP, PLLC (57) ABSTRACT

Embodiments relate to efficiently viewing data items in a three-dimensional (3D) space. The 3D space includes a curved surface that is concave with respect to a user-controlled viewpoint in the 3D space. The viewpoint is for controlling the direction and location of a rendered view of the 3D space. The data items have respective values associated therewith. The data items are arranged on the surface according to their values so that a user's ease of viewing the data items varies with their values; data items with some values may be arranged to be easier to view by manipulating the view direction than others (e.g., those with lower values). Ease of viewing can stem from how the surface is oriented relative to the viewpoint, the orientation of the curvature of the surface, the orientation of a controlling reference orientation, alignment of the data items on the surface, etc.

20 Claims, 11 Drawing Sheets

CURVED DISPLAY OF CONTENT IN MIXED REALITY

RELATED APPLICATION

This application is a continuation patent application of copending application with Ser. No. 15/899,241, filed Feb. 19, 2018, entitled "CURVED DISPLAY OF CONTENT IN MIXED REALITY", which is now allowed. The aforementioned application is hereby incorporated herein by reference.

BACKGROUND

Virtual and augmented reality systems (collectively, "mixed reality" hereafter) have been commonly used to navigate three-dimensional (3D) information and 3D spaces. User interaction with 3D mixed reality has largely been about navigating in 3D space. Recently there has been appreciation for how mixed reality can be useful not just for exposing a three-dimensional space, but also for 3D exploration of data that may not be 3D in nature.

Consider, for example, that it might be desirable to present a set of data items in three dimensions. Presentation of data items in 3D mixed reality has only mimicked the presentation of data items in two dimensions. For instance, two-dimensional (2D) grids are used in 2D user interfaces. Such a grid might be translated to a 3D space in a variety of ways, for instance by texture-mapping the grid onto a surface or object in the 3D space. Or, the grid might be presented as a floating 2D rectangle, etc. Regardless of how a grid or the like is presented in a 3D space, the interactive behavior of the grid in the 3D space is often no different than that of a grid in a 2D user interface. If a grid in a 3D mixed reality includes scrolling behavior, the scrolling behavior may be nearly the same as a grid in a 2D user interface; scrolling a fixed layout of data items in the directions of user inputs.

In addition, the ways sets of data items have been arranged in three dimensions is little different than the ways they have been arranged in two dimensions. Displayed data items might be ordered according to a feature or parameter of the data items. The layout of the data items, even if presented in a 3D space, mirrors that of 2D layouts. Data items have not been arranged and presented in mixed reality systems in ways that are attuned to the features of many such mixed reality systems.

SUMMARY

The following summary is included only to introduce some concepts discussed in the Detailed Description below. This summary is not comprehensive and is not intended to delineate the scope of the claimed subject matter, which is set forth by the claims presented at the end.

Embodiments relate to efficiently viewing data items in a three-dimensional (3D) space. The 3D space includes a curved surface that is concave with respect to a user-controlled viewpoint in the 3D space. The viewpoint is for controlling the direction and location of a rendered view of the 3D space. The data items have respective values associated therewith. The data items are arranged on the surface according to their values so that a user's ease of viewing the data items varies with their values; data items with some values may be arranged to be easier to view by manipulating the view direction than others (e.g., those with lower values). Ease of viewing can stem from how the surface is oriented relative to the viewpoint, the orientation of the curvature of the surface, the orientation of a controlling reference orientation, alignment of the data items on the surface, etc.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Figure 1:
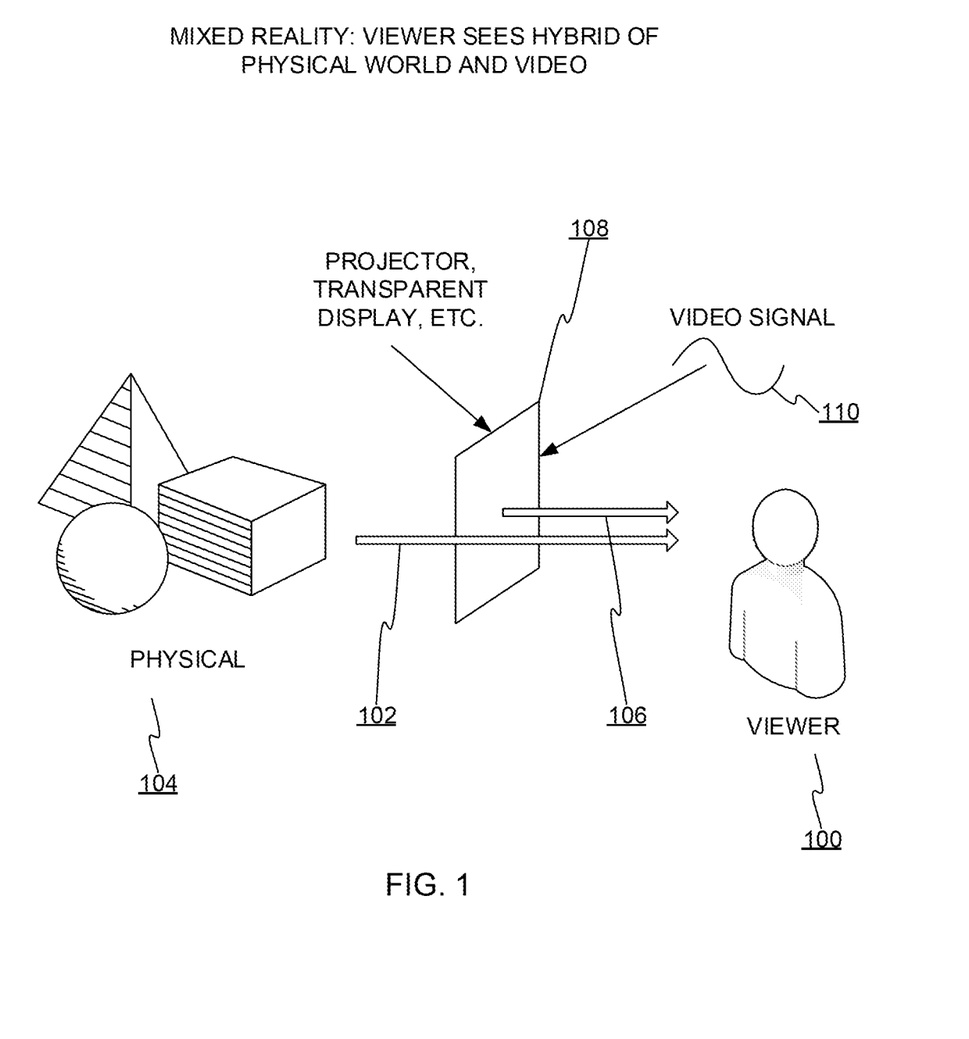
FIG. 1 shows a mixed reality presentation where the eyes of a viewer or user receive a mixture of (i) real world light reflected from a physical space and (ii) computer rendered light.
Figure 2:
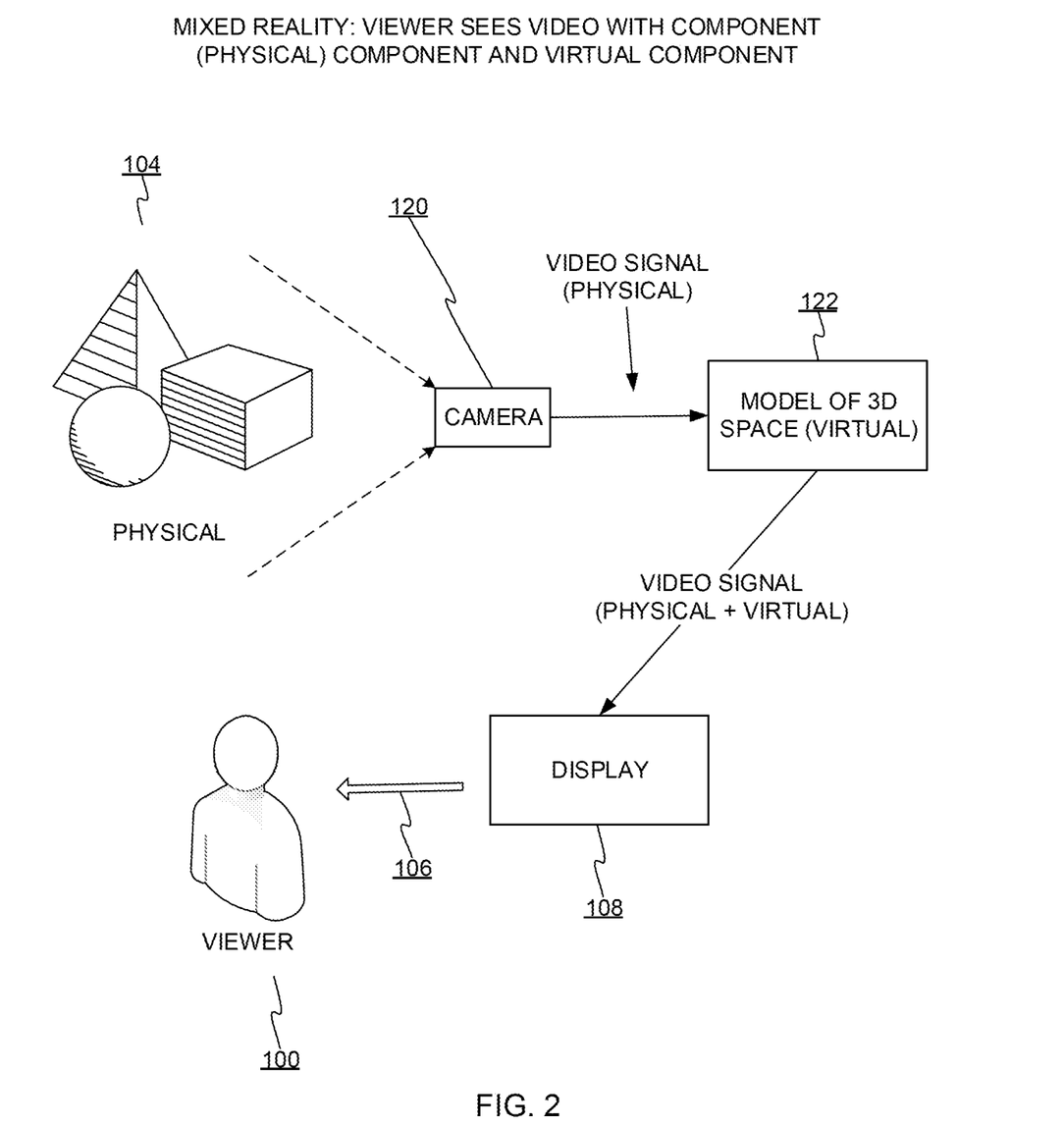
FIG. 2 shows a mixed reality configuration where the eyes of the user receive primarily computer rendered light.
Figure 3:
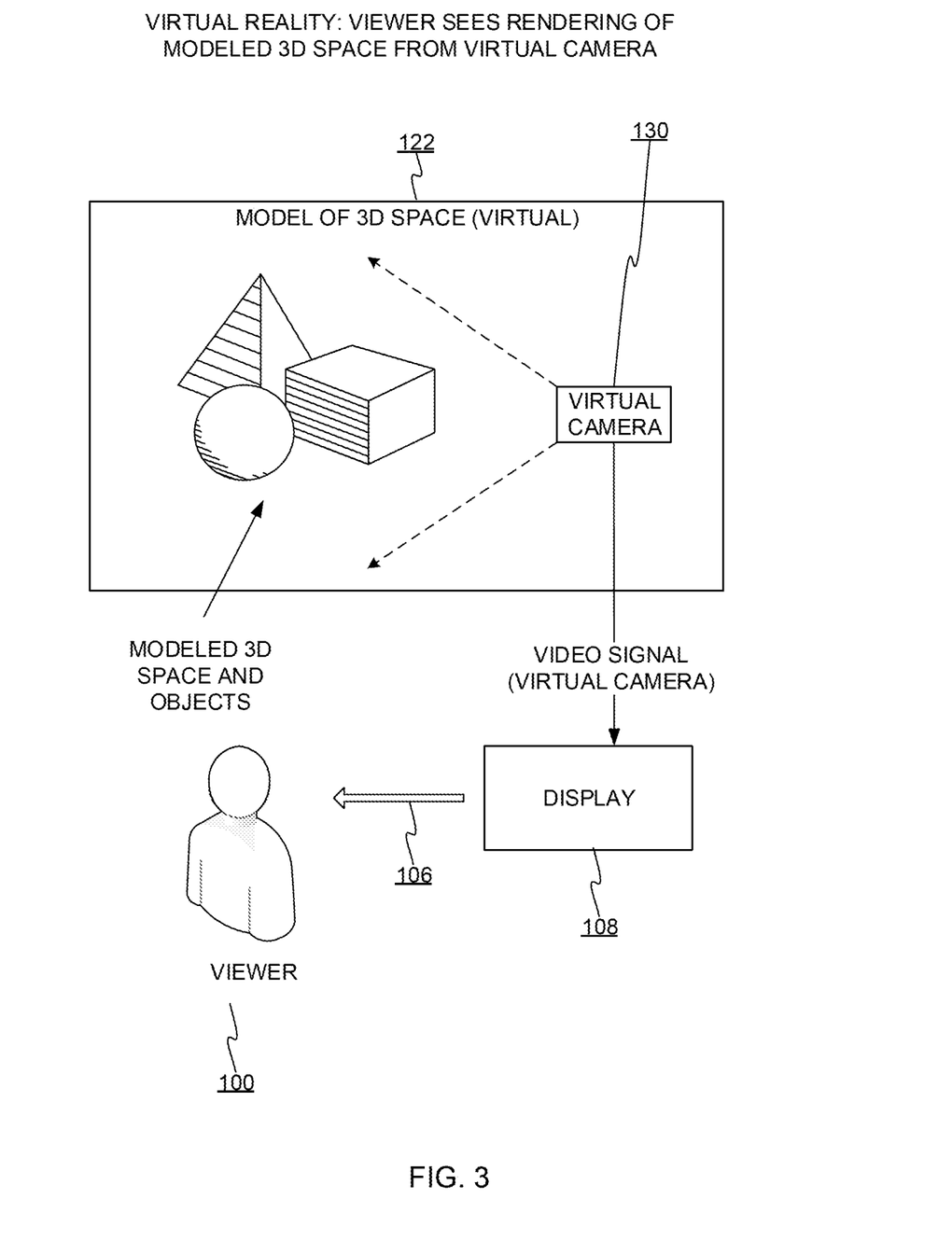
FIG. 3 shows a virtual reality (VR) variant of a mixed reality system.

FIGS. 1-3 show types of mixed realities for which embodiments described herein may be applied. As noted in the Background, the term "mixed reality" as used herein refers to virtual reality and various types of augmented reality.

FIG. 1 shows a mixed reality presentation where the eyes of a viewer or user 100 receive a mixture of (i) real-world light 102 reflected from a physical space 104 and (ii) computer rendered light 106. That is, the user perceives the mixed reality as a composition of computer-generated light and real-world light. The real-world light 102 is light from an ambient source (artificial or natural light) that has reflected from the physical space 104 and passes as such to the eyes of the user 100; the real-world light is not computer rendered light, and may pass to the eye directly, by reflection, and/or by transmission through transparent or optically transformative material. In contrast, the computer rendered light 106 is emitted by any type display device 108 that converts a video signal 110 generated by a computer into light formed to an image that corresponds to the content of the video signal 110.

The display device 108 may be any type of such signal-to-light converting device. In the type of hybrid physical-virtual reality shown in FIG. 1, the display device 108 may any type of device that allows the real-world light 102 and the computer rendered light 106 (generated by the display device 108) to both fall on the eyes of the user 100 at the same time, thus forming a composite physical-virtual image on the retinas of the user 100. The display device 108 might be a transparent or semi-transparent device ("transparent" as used hereafter will also refer to "semi-transparent") that can both generate the computer rendered light 106 and allow the real-world light 102 to pass through it (often referred to as a "heads-up" display). The display device 108 in the case of FIG. 1 might be a small video projector mounted on goggles or glasses that projects its image onto transparent lenses of the goggles or glasses (a head mounted heads-up display). The display device 108 may be a projector that projects onto a large transparent surface (a fixed heads-up display). The display device 108 may be a small projector that projects directly onto the user's retina without the user of a reflective surface. The display device 108 may be a transparent volumetric display or three-dimensional (3D) projection. Any type of device that can render a video signal 110 into visible light and can also permit composition of such light with physical world light will be suitable for the type of mixed reality shown in FIG. 1.

FIG. 2 shows a mixed reality configuration where the eyes of the user 100 perceive the mixed reality as primarily computer rendered light 106. The computer rendered light 106 comprises rendered video whose frames include (i) real world image data of the physical space 104 as captured by a camera 120, and (ii) virtual image data generated by a computer. The virtual image data is generated and rendered by a computer, for example from a model of a 3D space 122, a two-dimensional (2D) model (e.g. a windowing desktop), or other virtual space under the interactive control of the user 102. In this type of mixed reality, the user 102 sees a full computer-rendered image, but the image seen by the view includes both artificially generated graphic data as well as image data provided by the camera 120. Note that the video signal from camera 120 may be either a pre-recorded signal or a real-time signal. The mixed reality is presented by the display device 108, which may be a flat-panel display, a touch-sensitive display surface, a projector, a volumetric display, a head-mounted display (e.g., virtual reality (VR) goggles), or any other technology used to produce full-frame renderings of video produced by a computing device.

FIG. 3 shows a VR variant of a mixed reality system. This type of mixed reality is primarily computer-derived. As with FIG. 2, a model of a 3D space 122 is provided. The user 102 manipulates a point of view or virtual camera 130, and a VR engine renders the view in the 3D space as "seen" by the virtual camera 130. The VR engine generates graphics that the computer translates into a video signal that the display device 108 then displays. The display device 108 may be any type of display discussed above. Aside from information augmentation and related techniques described herein, basic 3D modeling, rendering, and displaying are conventional and description thereof is readily found elsewhere. The VR variant may be considered a form of mixed reality in that artifacts within the modeled 3D space may include image data captured of physical objects or scenery. For example, previously captured videos or digital images of physical persons may be incorporated into the model of the 3D space 122. The real-world image data may be modeled as independent objects (e.g., rectangles, ovals, etc.) such as 2D digital photos three-dimensionally arranged and oriented within the model of the 3D space 122. The real-world image data may also be incorporated as textures of 3D objects or surfaces modeled in the 3D space (e.g., texture-mapped to a 3D model of a display, picture frame, wall, etc.).

Figure 4:
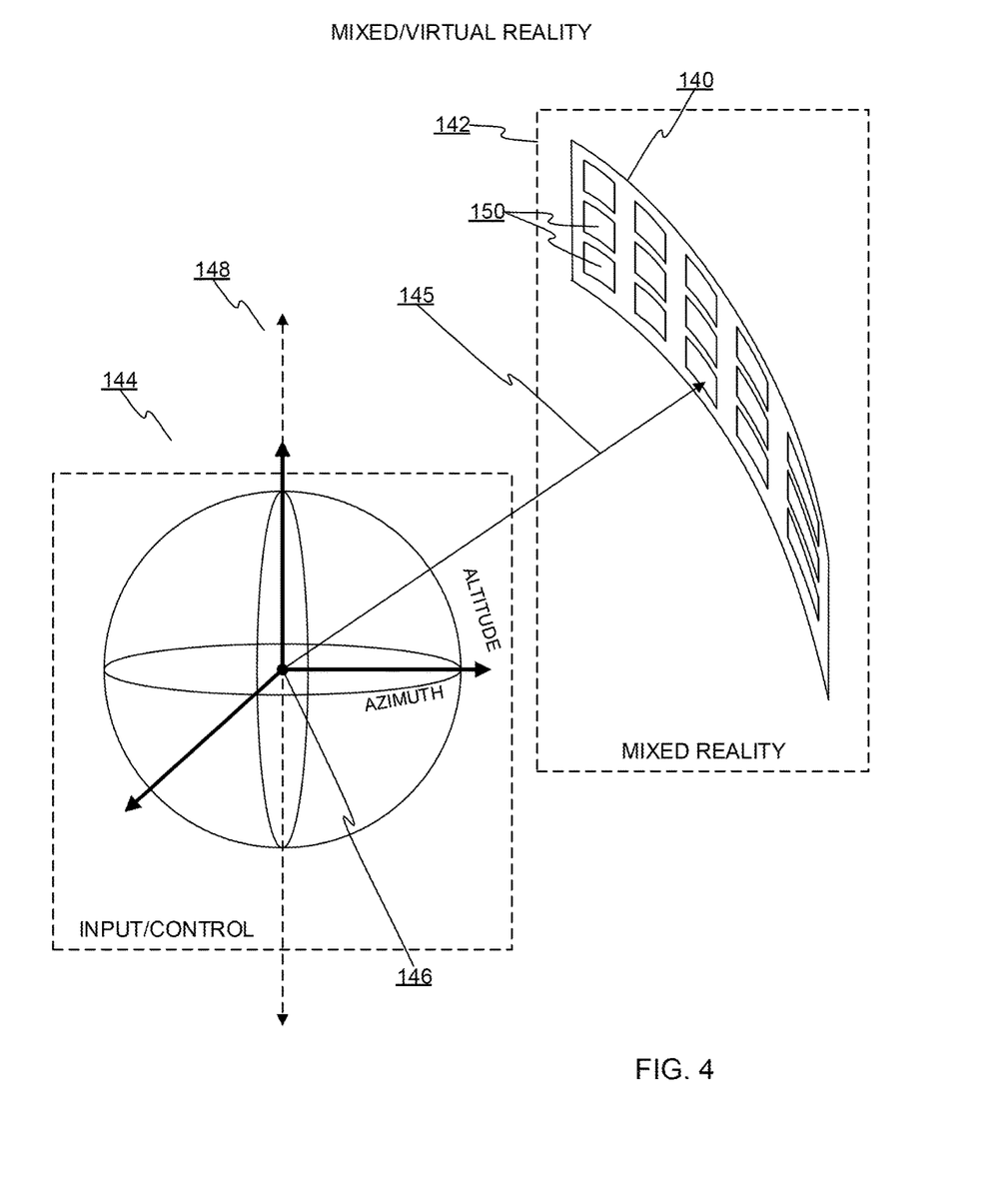
FIG. 4 shows a 3D surface in a mixed reality.

FIG. 4 shows a 3D surface 140 in a mixed reality 142. An input/control system 144 is manipulated by a user to change the viewing orientation or direction 145 and/or location of a virtual camera or viewpoint 146 within the mixed reality 142. A view (camera projection) within the mixed reality 142 may be rendered and displayed according to the location and direction 145 of the viewpoint 146. As the location/direction of the viewpoint 146 changes per input from the input/control system 144, the rendering changes accordingly.

The input/control system 144 may be any type of known hardware and software system that can be manipulated by a user for providing three-dimensional input control in the mixed reality 142. The input/control system 144 preferably can be physically interacted with by a user in ways that can be mapped to translation and rotation of the viewpoint 146 in the mixed reality 142.

In one embodiment, the input/control system 144 includes one or two handheld input devices that may sense, e.g. with gyroscopes, and/or be sensed, to provide 3D inputs such as orientations, translations, 3D points, etc. A handheld input device might have a sense-able orientation that can be used to control a virtual pointer in the mixed reality; a user may point the handheld input device in different physical directions to control the location of a pointer in the mixed reality, which in turn can be used to interact with the mixed reality, including with the surface 140. The input/control system 144 may additionally (or alternatively) involve a head-mounted display whose position and orientation are also sensed and used to allow interaction and/or navigation within the mixed reality 142.

In yet another embodiment, the input/control system 144 may be a fixed set of sensors (e.g., radar, camera) that sense the location/orientation of a user and/or objects held by the user. A combination of fixed and person-attached sensors may be used. In still another embodiment, the input/control system 144 may be a voice-recognition system where the user speaks voice commands that are recognized and mapped to control inputs (e.g., "move left", "gaze up", "move forward and look 90 degrees to the right", "continue moving sideways while gazing left and right", etc.).

Any combination of known physical input systems may be used that allows a user to control the gaze direction of the viewpoint 146 in at least two dimensions. For that purpose, even input hardware that senses only two dimensions may be used. In the case of a head-mounted display, assuming an arbitrary frame of reference in the mixed reality 142, and assuming a fixed location of the viewpoint 146 relative to the surface 140, the input/control system 144 allows a user to control an azimuth and altitude of the gaze direction at the viewpoint 146. As used herein, "azimuth" and "altitude" are relative terms and are not bound to any specific virtual or physical reference frame such as gravity.

The input/control viewpoint 146 (or the mixed reality 142) may also have a reference orientation 148 that is independent of the gaze direction 145, and which is used to orient the surface 140 (or the layout of data items 150). For example, there may be an axis 148 oriented relative to the surface mixed reality 142. The axis 148 might set in a number of ways. For instance, the reference orientation 148 may correspond to a sensed head/body orientation, where azimuth is controlled by side-to-side head rotation and altitude is controlled by head tilting. The reference orientation 148 might be controlled by the orientation of a handheld device. In any case, a reference orientation 148 can be used to orient the surface 140 within the mixed reality 142. Some embodiments do not use a reference orientation 148, or, the reference orientation 148 is fixed (e.g., vertical).

Figure 5:
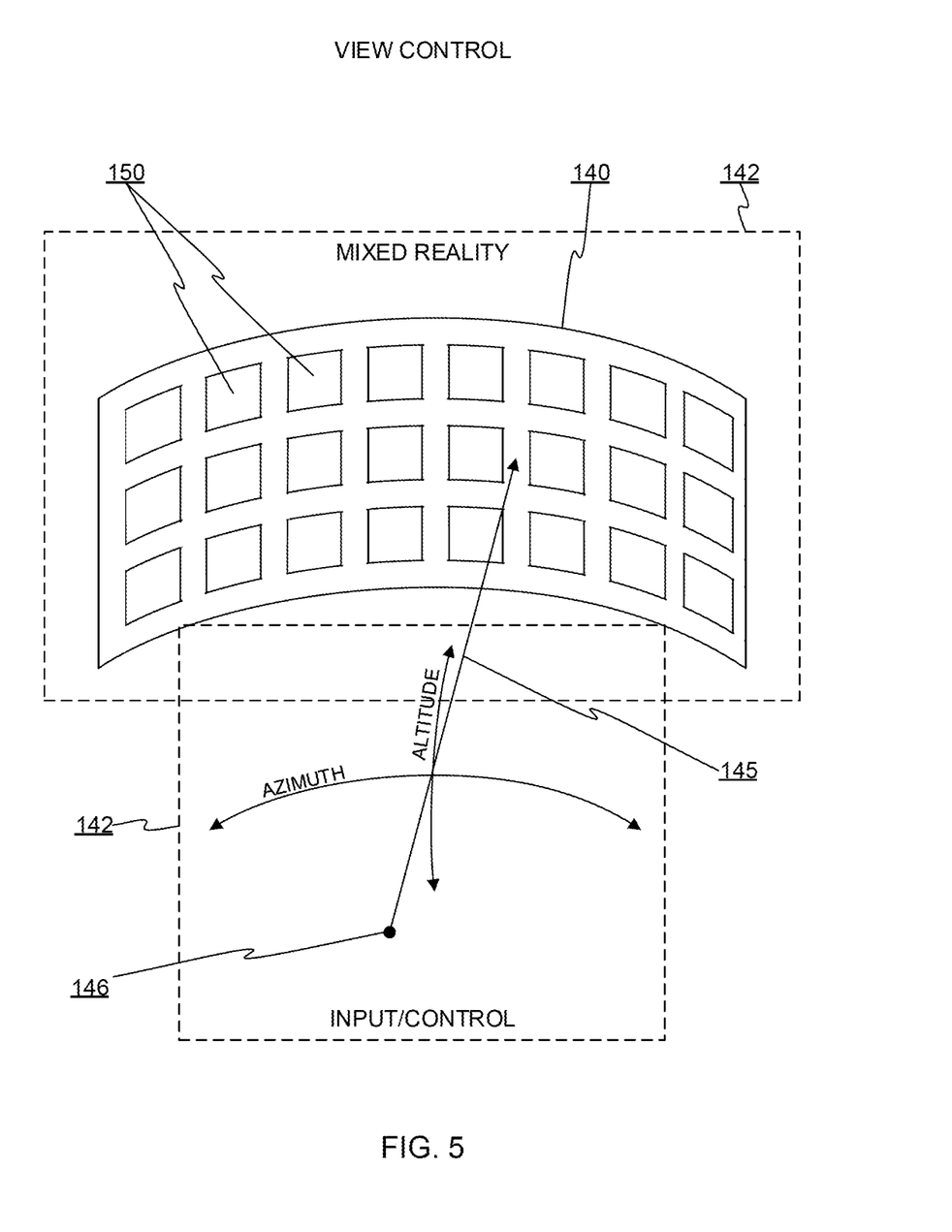
FIG. 5 shows a view of an input/control system and a surface of data items.

FIG. 5 shows another view of the input/control system 142 and the surface 140 of data items 150. An image of a rendering of the surface 140 in the mixed reality might appear as the dashed-line rectangle around the surface 140 (the dashed-line rectangle representing a projection in the mixed reality 142 located and oriented according to the location and orientation of the viewpoint 146. As noted above, the surface 140 includes data items 150 arranged using techniques described further below.

The surface 140 may be navigated or manipulated by a user using the input/control system 146. In one embodiment, the surface 140 is like any other object in the mixed reality 142 and is viewed by ordinary translation/aiming of the viewpoint 146. From the viewpoint 146, a user might alter the azimuth and altitude of the direction 145 to gaze at different parts of the surface 140. If a reference orientation 148 is being used, the orientation of the surface 140 (relative to the currently rendered view of the mixed reality 142) may depend on the reference orientation 148. For instance, if the reference orientation 148 is driven by the orientation of the user's head, then the surface 140 may be re-oriented relative to the mixed reality 142 to maintain an orientation aligned with the user's head.

The input/control system 146 may be used to view or manipulate the surface 140 in several ways. As noted above, ordinary 3D azimuth/altitude control may be viewed in the same way any other object in the mixed reality is viewed. That is, the surface 140 is fixed relative to the mixed reality and is viewed as a static part of the mixed reality. In other embodiments, the surface 140 has dynamic behavior. As noted above, the surface 140 may be orientation-locked to a reference orientation.

The surface 140 may be configured with scrolling-type behavior; manipulation of the input/control system 146 causes the surface 140 to change relative to the mixed reality. For example, the surface 140 may rotate in the azimuthal direction based on azimuthal control inputs (e.g., head rotation left or right). Detection of a change of the gaze direction 145 of a sufficient angle and direction may cause auto-scrolling of the surface 140, with speed possibly controlled by the angle or angular speed of the gaze direction 145. Such automated scrolling may be implemented by altering a 3D model of the surface 140 in the mixed reality and/or by altering graphic content that is mapped to a surface of the 3D model. The former case may involve rotating the 3D model of the surface in a manner akin to rotating a cylinder about its central axis. The latter case may involve drawing animation of scrolling data items 150 on the surface. In sum, a user may use the input/control system 142 to control how the surface 140 is viewed.

The shape of the surface 140 is preferably concave relative to the viewpoint, at least in one dimension (e.g., azimuthal). In one embodiment, the surface 140 is a section of a cylinder, which would make all data items on a circumference line equidistant from the viewpoint when the viewpoint coincides with the axis of the cylinder. Any type of curved shape may be used; a conical section, a sphere or sphere section, etc. Moreover, the term "surface" as used herein refers to a more general category of structure than literal surfaces. The surface 140 may be implemented as any type of object or objects that the mixed reality environment provides. The surface 140 may be a mesh model or a mathematical model (e.g., a non-uniform rational basis spline). Alternatively, the surface 140 may be a definition of a locus of points defined relative to a focal point (e.g., the position of the viewpoint 146), and the data items 150 are each distinct objects in the mixed reality 142 that are arranged in the mixed reality 142 according to the locus definition. In other words, the surface 140 may be implemented as a cohesive cloud of data items 150, perhaps collectively forming a shape similar to a cylinder surface. In yet another embodiment, the surface 140 is implemented as a projection where the data items, projected from a virtual projector, have a radial arrangement described below, so that where the data items are displayed in the mixed reality depends on what objects the projection falls upon.

Although the data items 150 may generally form a concave curved shape, they need not be arranged as a smooth surface. It is possible for there to be a smooth model (mathematical or mesh), but the data items are not arranged strictly on the model. Rather the data items have some varying normal distance from the surface of the model, perhaps set according to a parameter of the data items. The term "surface", as used herein to refer to a tool for displaying data items 150, refers to all of the implementation variations mentioned above.

The data items 150 may be any arbitrary object or unit of information. Each data item 150 is represented by a respective graphic displayed as part of the surface 140. The graphic may be a patch, an image, a 3D model, or the like. The graphic may be flat or curved. The data items 150 include some common feature or parameter whose value varies from item to item. For instance, each data item 150 may have an integer score. Data items 150 may have many parameters, which can be used as described further below. The parameters of the data items 150 can be any arbitrary type of information, e.g., numeric values, keywords, typing data, relevance scores, metadata, etc. In one embodiment, the data items 150 are digital photos with typical photographic parameters (metadata) and perhaps other information according to the application (e.g., keyword subsets, relevancies to a current topic or query, etc.). In another embodiment, the graphic representations of the data items 150 are merely graphic constructs such as drawn rectangles, icons, etc. The graphic representations of the data items may or may not be related to the parameters of the data items. The graphic representations may have varying size and other characteristics, any of which may incidentally serve as a surface-arranging parameter. The graphic representations may be oriented to match the curvature of the surface, a reference orientation, etc. If the graphic representations are flat, they may be oriented to face in the direction of respective normals of the surface at the locations on the surface where they are algorithmically placed. That is, the graphic representations may face the viewpoint or a focal point (or longitudinal axis) of the curved surface.

Figure 6:
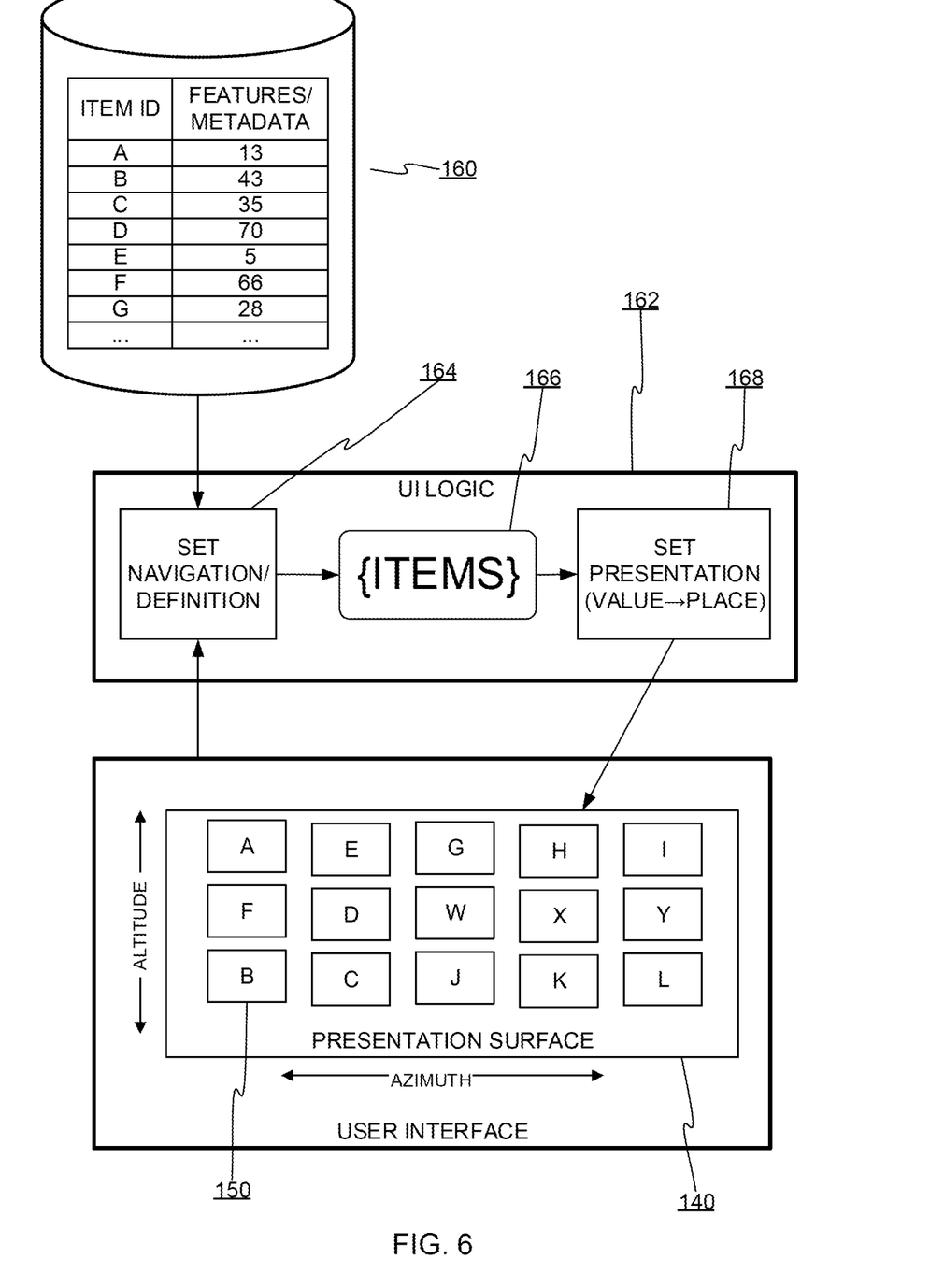
FIG. 6 shows how data items may be managed and presented.

FIG. 6 shows how data items 150 may be managed and presented. The data items originate from an information source 160 such as a database, a search engine, a custom datastore, a markup-text file, etc. As noted above, the data items may have multiple parameters, although the example of FIG. 6 shows only one parameter. The surface 140 may be implemented in part with UI logic 162 that controls the selection and arrangement of data items on the surface 140. Th UI logic 162 may be implemented or hosted within the software that implements the mixed reality environment, although parts may be implemented elsewhere, for instance a set definition module 164. The set definition module 164 receives set definition criteria (e.g., per user input) and selects the appropriate data items from the information source 160. The resulting current itemset 166 consists of the data items that are currently to be presented on the surface 140.

The UI logic 162 also includes a set presentation module 168. The set presentation module 168 manages the layout, on the surface 140, of the data items in the current itemset 166. In one embodiment, the set presentation module 168 maps a value or parameter of a data item to a 2D coordinate (e.g., a grid coordinate or a cartesian location), and separate logic maps the 2D layout to the surface. In another embodiment, the presentation module 168 arranges the data items within the mixed reality directly, thus effectuating a concave presentation of the data items. Details of how data items are arranged in mixed reality will become apparent.

Figure 7:
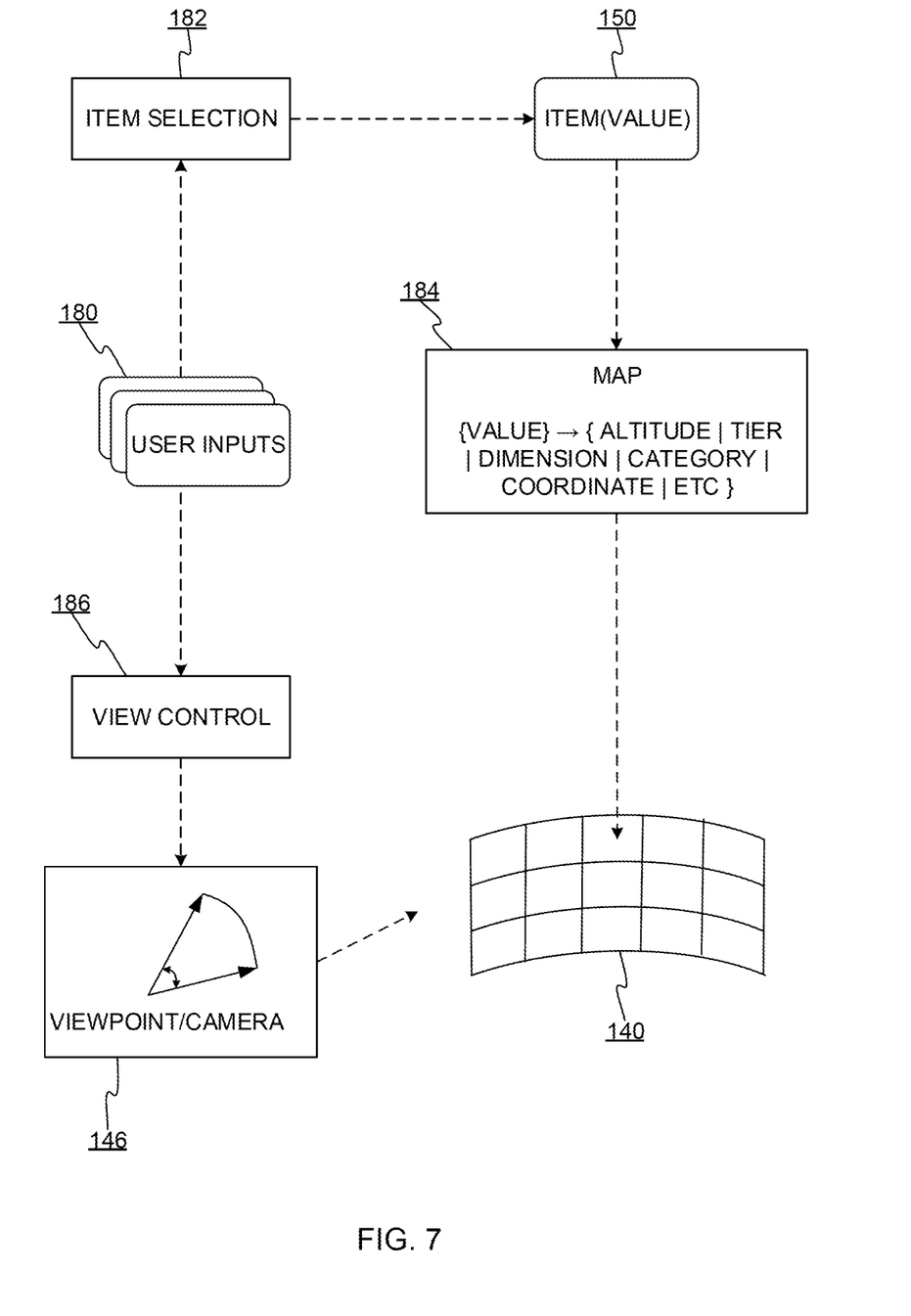
FIG. 7 shows flow of input to configure and control the surface.

FIG. 7 shows flow of input to configure and control the surface 140. User inputs 180 are inputted using any of the techniques described above. Some of the user inputs control an item selection function 182. The item selection function 182 passes data items 150 to a map 184. The map 184 maps a value (or values) associated with a data item, for instance a parameter, metadata field, computed relevancy score, etc., to placement information. The placement information places the data item on the surface 140 (or in 3D space, to form the surface). The user inputs 180 can also manipulate a view control module 186 that steers the position and/or orientation of the viewpoint as described above.

The item selection function 182 may be an interface to a search engine, where the user defines search criteria and the search engine returns data items scored by relevance to the search criteria; in this case the score is mapped by map 184 to the surface 140. As another example, a web service provides reviews of restaurants, the data items are restaurant review records, and the restaurants are represented by images thereof. A user interface for selecting or setting a topic may also serve as the selection function 182. Any time the user selects a new topic, the set of data items most relevant to the topic is formed and displayed. Selection of a data item or an element thereof may itself change the topic. Any known technique for enabling a user to define a set of data may be used.

The map 184 may be implemented as any type of transform from one or more dimensions (properties of the data items) to the 2 or 3 dimensions of the surface 140. Some transforms may be particularly helpful. Consider that some input/control systems may be designed in ways that create a preferred control direction. It may be easier to move the gaze (viewpoint) in one direction (e.g., left-right) than another (e.g., up-down), as is the case with systems that control gaze direction using head orientation. In these systems, since it is easier to move the head from side-to-side, the data items may be arranged in a way that makes the user's visual exploration more likely to be from side to side. Conversely, if there is a direction that is harder to use (e.g., the gaze direction's altitude), the data items may be arranged to minimize the need to look in that direction.

When a set of data items to be presented is considered as visual information that requires steering of a focal point or view to be absorbed by the user, some arrangements of the data items may allow the user to take in the visual information more efficiently. Each data item can be given a score that in practice corresponds to the likelihood of being viewed by the user or being considered important or relevant to the user. By aligning the data items of similar or equal importance on the surface in a direction that matches the direction of a preferred/easiest gaze movement (e.g., azimuthal), the easiest direction of gaze control may coincide with the most likely direction of gaze movement, thus reducing the overall burden on the user when visually exploring the data items displayed on the surface 140.

The importance or rank of a data item can be computed in any way that reflects what is expected to be important to the user. In a simple implementation, importance is merely a trait of each data item (e.g., computed by an external search engine). Another implementation involves combining traits of a data item, perhaps in weighted fashion, to compute a composite relevance or importance score. In another embodiment, the data items may be mapped to pre-defined categories. The data items in the categories are arranged on the surface 140 in stratums that are aligned with the preferred gaze-control direction. Thus, a user may look at the data items within a given category by looking at only that stratum, which involves mostly gazing in the easiest direction (e.g., left-to-right).

The stratum or categories themselves might also be ranked. A secondary importance score/metric may be used to arrange the stratum substantially perpendicular to the preferred gaze direction (e.g., altitudinal). In this way, importance decreases in the direction that is more difficult to look. In the case of head-direction gaze control, where gaze altitude is less ergonomically efficient, the stratum may be stacked in order of importance, with the most important stratum set to a gaze altitude that corresponds to an easiest gaze direction, for example the "looking straight ahead" or "eye level" gaze direction. With this technique, the most important category/stratum is arranged at virtual eye-level, and less important layers are above or below it. If it is considered easier to look in one direction than another (e.g., easier to look down than up), then the most important layer may be at eye level and layers decrease in importance in the gaze-down direction (altitude declination).

The general observation about directional layout bias and importance can be capitalized on in numerous ways. As alluded to above, the efficiency of information perusal can be improved by aligning the data items so that items likely to be considered of equal importance by the user can be viewed with the preferred direction of gaze control (e.g., azimuthal). Because the user is likely to consider all such aligned data items of equal importance, the user is more likely to gaze among those items, and consequently, a bias of gazing in the easiest direction is created. Since it is easier to rotate the head from side to side, for instance, it can be beneficial to maximize gaze pointing in that direction (azimuthal).

The map 184 may map data items in ways that improve gaze efficiency but do not require a strict rectilinear layout. Consider data items that have two dimensions of importance/relevance. Placement on the surface 140 may be a function of both dimensions, with greater weight given to the first dimension. Stratums may tend to run along the "easy gaze" direction but bulge toward the forward gaze direction. Benefit may be gained in any arrangement where on average items of equal importance tend to be aligned with the direction of easiest gaze (e.g., azimuthal) and items of lesser importance tend to be arranged in the other direction (e.g., altitudinal) according to their importance, with less important items possibly being further from a gaze horizon. Another approach is to place data items based partly on importance and partly on other factors. For example, data items might be placed into bands according to a primary basis and may be placed within a band on a secondary basis such as a random value or a secondary trait of the data item. Secondary placement within a band might involve multiple spatial dimensions, for instance, a location within a band and a distance from the surface. Such bands may also be three dimensional tubes, volumetric sections, etc., so long as there is a directional bias in placement of the data items.

As noted above, some embodiments may employ a reference orientation 148. In that case, if data items are mapped to a layout (e.g., in two dimensions) that is in turn mapped to a model of the surface, then it may be desirable to orient the surface 140 with the reference orientation 148. If data items are mapped directly to respective poses in the mixed reality space without the use of a surface model, then the map 184 may take into account the reference orientation 148 to arrange the data items accordingly. In some embodiments, the reference orientation 148 is (or indicates) a preferred gaze direction (e.g., azimuthal). The surface may itself be oriented according to a feature thereof. For instance, if the surface is a section of a cylinder-like shape, then the feature might be a central axis or a normal to a direction of surface curvature. Orienting the surface's shape or curvature in this way can further improve viewing efficiency. If the surface is oriented so that its direction of curvature (e.g., azimuthal) aligns with the direction of easiest gaze control, then the user benefits from, on average, not having to refocus the eyes as much when steering focus from item-to-item among items of a somewhat equal relative importance in the direction of easy gazing. On average, the user may spend less effort adjusting the focus of their eyes to look further and closer away while perusing the data items on the surface.

Figure 8:
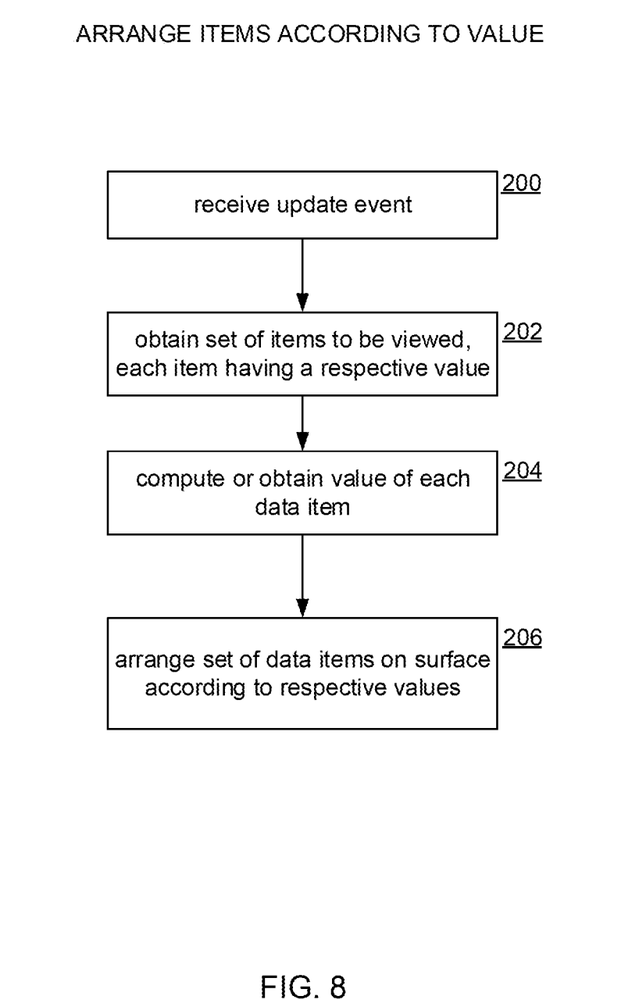
FIG. 8 shows a process for arranging data items according to values respectively associated therewith.

FIG. 8 shows a process for arranging data items according to values respectively associated therewith. A set of data items is assumed. As noted above, the associated values may be derived separate from the data items or they may be attributes of the data items. At step 200 there is a trigger or update event that causes arrangement of the data items on the surface to proceed. The update event might be a change to the value associated with a data item, a change to which data items are present in the current set of data items, a change to which parameter(s) are being used to rank the data items, or any other event that might affect the mapping/ordering of the data items, the makeup of the current set of data items, and so forth. Accordingly, at step 202, if necessary, the set of data items that are to be displayed on the surface may be derived or recomputed. Additionally, or alternatively, at step 204, the value of each data item is obtained, computed, recomputed, or otherwise prepared for use in mapping. At step 206 the data items are arranged on the surface according to their values using any of the techniques described above.

Figure 9:
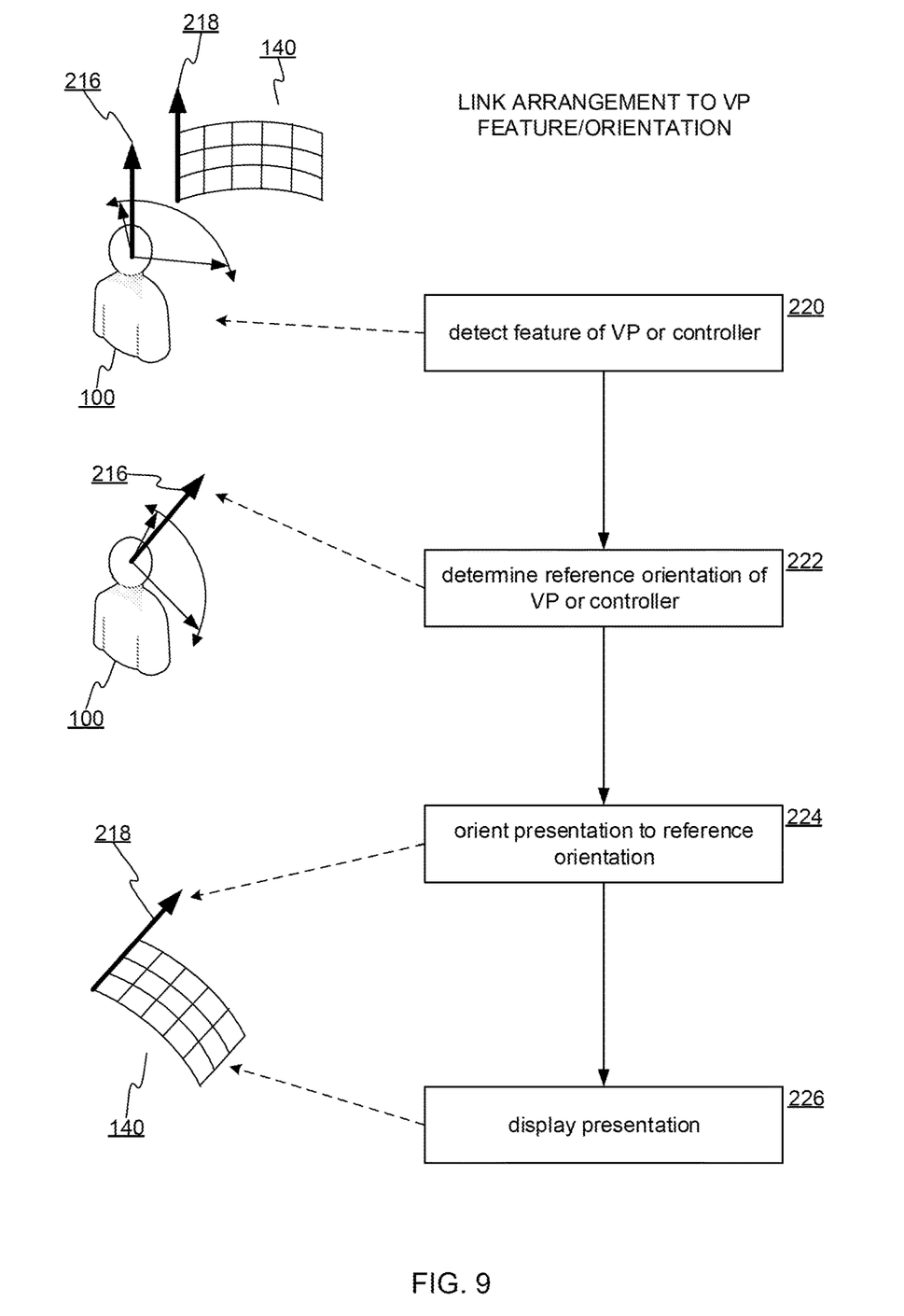
FIG. 9 shows a process for linking the arrangement of the surface to a feature of the viewpoint or the input/control system.

FIG. 9 shows a process for linking the arrangement of the surface 140 to a feature of the viewpoint or the input/control system. As noted above, the input/control system may have a feature 216, and it may be helpful to set an orientation 218 of the surface 140 according to the feature of the viewpoint or input/control system. In one embodiment the feature 216 is an orientation of the input/control system (e.g. a handheld or head-mounted device), an orientation of the user 100, etc. At step 220 the feature 216 is detected or read. At step 222, the feature 216, if it is not an orientation, is used to determine the reference orientation 148. At step 224, the orientation 218 of the surface 140 is set according to the reference orientation. As noted above, the orientation 218 of the surface may be related to the shape of the surface. For instance, the orientation 218 may be defined by a direction of principal curvature or by a direction of least curvature. In some cases, the surface may be oriented so that a direction of easiest viewpoint rotation (e.g., azimuthal) of the input/control system is aligned with a direction of maximum curvature of the surface.

The surface may also be oriented or arranged in the mixed reality according to the location of the user's viewpoint. The surface may be locked to the viewpoint so that as the viewpoint moves in the mixed reality the surface keeps a constant distance from the viewpoint and is kept facing the viewpoint. The viewpoint gaze direction may be rotated to face different points of the surface without moving the surface. If the viewpoint location changes then the surface changes accordingly.

As noted above, the set of data items being displayed may be dynamically changed. In one embodiment, the set of data items being displayed is seeded by selection of one of the data items. The selected data item controls the ranking/layout criteria that is being used to arrange the data items. For instance, if each data item has a topic field, then when a data item is selected, the selected item's topic becomes the current topic, the selected data item is displayed at the center of the surface, and other data items relevant to the current topic "explode" out from under the selected data item, moving in animated fashion to positions on the surface determined by their relevance to the new topic.

Another visual enhancement is to distort a surface of an existing object in the mixed reality space to take on the desired shape of the surface to display data items. When display of the surface is needed, the surface is gradually altered—structurally or mathematically—to change its shape to the shape of the surface. If the surface is to be moved, distortion animations may show the surface location/orientation changing.

Figure 10:
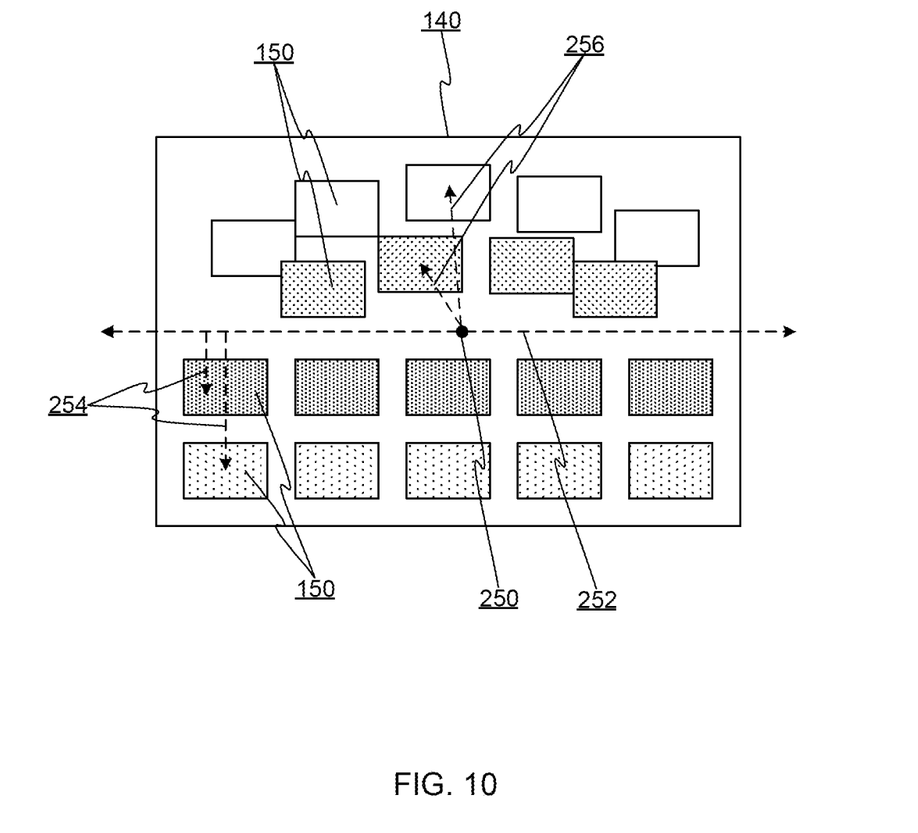
FIG. 10 shows how data items can be aligned on the surface.

FIG. 10 shows how data items 150 can be aligned on the surface 140. As mentioned above, the data items 150 may be aligned according to a reference point 250 or reference line 252 of the surface 140. The reference point 250 or reference line 252 may be a line or point of maximal curvature, a horizon line (or point thereon) of the viewpoint, an interactively controlled reference orientation, etc. In an embodiment shown in the lower half of the surface 140, map 184 may map the data items 150 to the surface 140 in a linear (or rectilinear) fashion. Alignment of the data items is oriented to the reference line 252. The distance of the data items from the reference line 252 depends on the values of the respective data items. In the lower example, distances 254 of the data items from the reference line 252 increase (or decrease) with the value. In the lower example of FIG. 10, the darker data items have a higher value (or higher value range) than the lighter data items. The distances 254 may increase (or decrease) monotonically with the value, or may do so on average but with some minor variation for the graphic size of the data items, random variation to avoid a grid pattern, minor adjustments due to secondary values/features of the data items, etc. In the upper example of FIG. 10, the map 184 may map the values to a radial pattern around the reference point 250. In this case, the distances 256 are from the reference point 250. The value of a data item may map to both a distance and an angle of the data item relative to the reference point. Alternatively, the angle may be random, determined by a secondary value of the data item, or otherwise.

Figure 11:
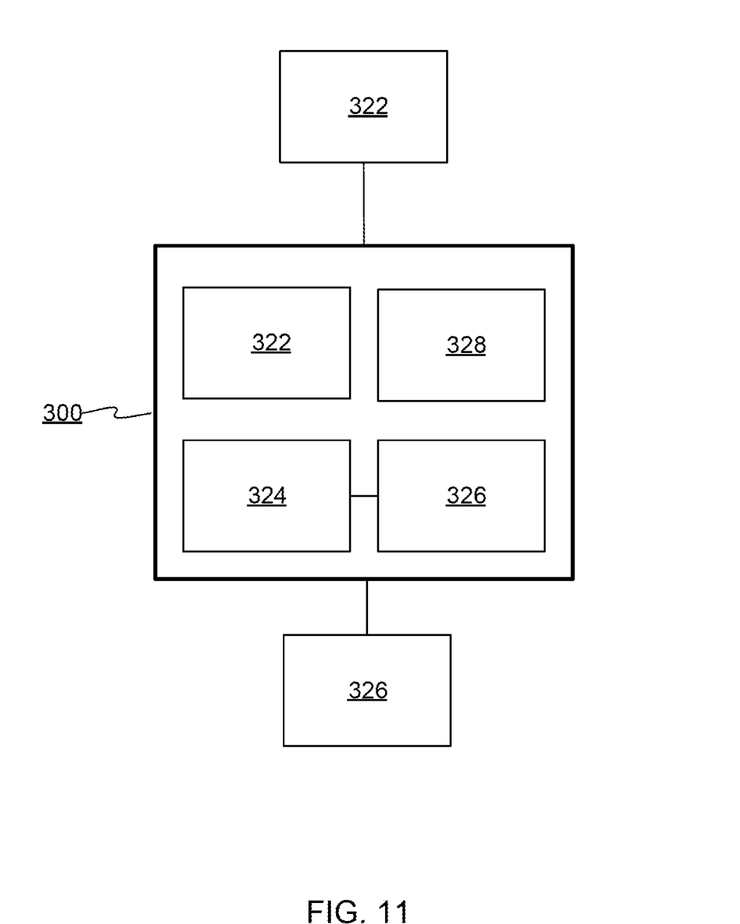
FIG. 11 shows details of a computing device on which embodiments described herein may be implemented.

FIG. 11 shows details of a computing device 300 on which embodiments described above may be implemented. The computing device 300 is an example of a client/personal device or backend physical (or virtual) server devices that may perform various (or perhaps most) of the processes described herein. The technical disclosures herein will suffice for programmers to write software, and/or configure reconfigurable processing hardware (e.g., field-programmable gate arrays (FPGAs)), and/or design application-specific integrated circuits (ASICs), etc., to run on the computing device 300 (possibly via cloud APIs) to implement the embodiments described herein.

The computing device 300 may have one or more displays 322, a camera (not shown), a network interface 324 (or several), as well as storage hardware 326 and processing hardware 328, which may be a combination of any one or more: central processing units, graphics processing units, analog-to-digital converters, bus chips, FPGAs, ASICs, Application-specific Standard Products (ASSPs), or Complex Programmable Logic Devices (CPLDs), etc. The storage hardware 326 may be any combination of magnetic storage, static memory, volatile memory, non-volatile memory, optically or magnetically readable matter, etc. The meaning of the term "storage", as used herein does not refer to signals or energy per se, but rather refers to physical apparatuses and states of matter. The hardware elements of the computing device 300 may cooperate in ways well understood in the art of machine computing. In addition, input devices may be integrated with or in communication with the computing device 300. The computing device 300 may have any form-factor or may be used in any type of encompassing device. The computing device 300 may be in the form of a handheld device such as a smartphone, a tablet computer, a gaming device, a server, a rack-mounted or backplaned computer-on-a-board, a system-on-a-chip, or others.

Embodiments and features discussed above can be realized in the form of information stored in volatile or non-volatile computer or device readable storage hardware. This is deemed to include at least hardware such as optical storage (e.g., compact-disk read-only memory (CD-ROM)), magnetic media, flash read-only memory (ROM), or any means of storing digital information in to be readily available for the processing hardware 328. The stored information can be in the form of machine executable instructions (e.g., compiled executable binary code), source code, bytecode, or any other information that can be used to enable or configure computing devices to perform the various embodiments discussed above. This is also considered to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A method performed by one or more computers comprising processing hardware and storage hardware, the method comprising:
generating and displaying renderings of a mixed reality scene comprised of a model of a three-dimensional (3D) space, a viewpoint having a view location and a view direction in the 3D space, and a surface in the 3D space that has concave 3D curvature facing the viewpoint, wherein the view direction is steered according to rotation inputs controlled by a user, wherein the view direction is configured to change relative to the surface, wherein changes in the view direction correspondingly move a reference line intersecting the surface;
accessing a set of data items comprising respective values and respective graphic representations configured to be included in the displayed renderings of the mixed reality scene;
arranging the graphic representations of the data items on the surface according to the respective values such that each data item's graphic representation is placed on the surface based at least in part on its respective value, the arranging comprising displaying the data items in a rectilinear pattern such that distances of the data items from the reference line vary according to the respective values of the data items; and
generating the renderings, according to the view location and the view direction, of the graphic representations arranged on the surface.

2. A method according to claim 1, wherein the reference line and data items move relative to the surface as the view direction changes relative to the surface.

3. A method according to claim 2, further wherein reference line is kept horizontal as the view direction changes.

4. A method according to claim 1, further comprising applying a map to the values to map the data items to locations on the surface, wherein the map aligns items in rows parallel to the reference line.

5. A method according to claim 1, wherein the graphic representations are arranged on the surface according to the values such that graphic representations of data items with different values differ in their distance from the reference line.

6. A method according to claim 5, wherein the graphic representations are arranged such that data items with same values are arranged parallel to the reference line.

7. A method according to claim 1, wherein the reference comprises a reference point where a ray projected from the view location in the view direction intersects the surface.

8. A computing device comprising:
processing hardware;
a display device; and
storage hardware storing information to enable the processing hardware to perform a process, the process comprising:
modeling a 3D space including a viewpoint and graphic items, wherein the viewpoint has a user-controllable direction from the viewpoint, the graphic items having respective values of a parameter; and
arranging the graphic items in the 3D space to form a 3D shape that is concave with respect to the viewpoint, wherein the graphic items are aligned in a radial pattern relative to each other according to their respective values, wherein the radial pattern includes a reference point, and wherein the radial pattern is formed by setting distances of the graphic items from the reference point according to the values of the graphic items, respectively.

9. A computing device according to claim 8, wherein the values comprise respective scores, and wherein the distances vary based at least in part on the scores so that higher scores are further away from the reference point.

10. A computing device according to claim 9, wherein the radial pattern is maintained in a horizontal alignment as the view direction changes.

11. A computing device according to claim 8, the process further comprising responding to setting of a selection criteria of the graphic items by selecting the graphic items to match the selection criteria.

12. A computing device according to claim 11, wherein the selection criteria is set in response to a user interaction directed to one of the graphic items.

13. A computing device according to claim 12, the process further comprising responding to the interaction with the one of the graphic items by moving the one of the graphic items toward the reference point.

14. A computing device according to claim 13, the process further comprising graphically distributing the selected graphic items from the one of the graphic items at the reference point.

15. A computing device according to claim 8, wherein the graphic items comprise respective images, and wherein the values correspond to respective features of the images.

16. A computer-readable storage device storing information configured to cause a computing device to perform a process, the process comprising:
  providing a mixed reality and a curved surface or a curved arrangement, the mixed reality including a viewpoint interactively pointable by a user, wherein the curved surface or curved arrangement is concave with respect to the viewpoint;
  accessing a set of data items from an information source, the set of data items have respective parameters;
  arranging the set of data items on the curved surface or into the curved arrangement, wherein the data items in the set are arranged on the curved surface or in the curved arrangement at respective distances from a reference point or reference line in the mixed reality, wherein the distances from the reference point or reference line vary and are determined according to the parameters;
  generating renderings of the mixed reality, including the curved surface or curved arrangement as viewed from the viewpoint; and
  displaying the renderings.

17. A computer-readable storage device according to claim 16, wherein the reference line corresponds to a horizon line of the viewpoint, a direction of primary curvature of the curved surface, or an interactively controlled reference orientation.

18. A computer-readable storage device according to claim 17, wherein the reference line is oriented according to the horizon line of the viewpoint, the direction of primary curvature of the curved surface, or the interactively controlled reference orientation.

19. A computer-readable storage device according to claim 16, the process further comprising scrolling the current data items across the curved surface responsive to interactive pointing of the viewpoint.

20. A computer-readable storage device according to claim 16, wherein the mixed reality comprises a three-dimensional virtual reality model.

* * * * *